United States Patent
Ha et al.

(10) Patent No.: US 10,820,087 B2
(45) Date of Patent: Oct. 27, 2020

(54) WIRELESS AUDIO SOURCE SWITCHING

(71) Applicant: Dolby Laboratories Licensing Corporation, San Francisco, CA (US)

(72) Inventors: Jack T. Ha, San Ramon, CA (US); Adam Scott Koniak, Redwood City, CA (US); Gareth James Selfe, San Francisco, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 16/311,650

(22) PCT Filed: Jun. 21, 2017

(86) PCT No.: PCT/US2017/038479
§ 371 (c)(1),
(2) Date: Dec. 19, 2018

(87) PCT Pub. No.: WO2017/223165
PCT Pub. Date: Dec. 28, 2017

(65) Prior Publication Data
US 2019/0215597 A1    Jul. 11, 2019

Related U.S. Application Data

(60) Provisional application No. 62/354,649, filed on Jun. 24, 2016.

(30) Foreign Application Priority Data

Jun. 24, 2016   (EP) ..................................... 16176287

(51) Int. Cl.
*G06F 3/16* (2006.01)
*H04W 84/20* (2009.01)
(Continued)

(52) U.S. Cl.
CPC ........... *H04R 1/1041* (2013.01); *G06F 3/165* (2013.01); *H04M 1/6066* (2013.01);
(Continued)

(58) Field of Classification Search
None
See application file for complete search history.

(56) References Cited

U.S. PATENT DOCUMENTS

2003/0223604 A1*  12/2003  Nakagawa .......... H04M 1/6066
                                                    381/311
2011/0059697 A1*   3/2011  Janik ................... H04M 1/6066
                                                    455/41.2
(Continued)

FOREIGN PATENT DOCUMENTS

WO    2009/032571    3/2009
WO    2009032571     3/2009
(Continued)

OTHER PUBLICATIONS

Plantronics Honored With Five CES Innovation Awards; Award-Winning Mobile, Office and Gaming Headsets Set Stage for Plantronics' Product Showcase at CES 2007 PR Newswire (Dec. 12, 2006) http://www.prnewswire.com/news-releases/plantronics-honored-with-five-ces-innovation-awards-56166522.html.
(Continued)

*Primary Examiner* — James K Mooney

(57) ABSTRACT

Methods, systems, and apparatus, including computer programs encoded on computer storage media, for wireless audio source switching. One of the methods includes receiving user input selecting a user interface control corresponding to one of a plurality of paired audio source devices with a wireless audio sink device that is a slave device of a first master/slave connection with a first paired audio source device of the plurality of paired audio source devices. The wireless audio sink device initiates a request to become a
(Continued)

master device of a second master/slave connection with a second paired audio source device corresponding to the selected user interface control. The wireless audio sink device sends to the second paired audio source device a request to become a slave device of the second master/slave connection. The wireless audio sink device receives audio input from the second paired audio source device and outputs the received audio input.

24 Claims, 8 Drawing Sheets

(51) Int. Cl.
| | |
|---|---|
| H04R 1/10 | (2006.01) |
| H04W 4/80 | (2018.01) |
| H04R 5/033 | (2006.01) |
| H04M 1/60 | (2006.01) |
| H04R 5/04 | (2006.01) |
| H04M 1/725 | (2006.01) |
| H04W 76/10 | (2018.01) |
| H04R 3/12 | (2006.01) |
| H04R 25/00 | (2006.01) |

(52) U.S. Cl.
CPC ............ *H04M 1/7253* (2013.01); *H04R 3/12* (2013.01); *H04R 5/033* (2013.01); *H04R 5/04* (2013.01); *H04W 4/80* (2018.02); *H04W 76/10* (2018.02); *H04W 84/20* (2013.01); *H04R 25/554* (2013.01); *H04R 2225/55* (2013.01); *H04R 2420/03* (2013.01); *H04R 2420/05* (2013.01); *H04R 2420/07* (2013.01)

(56) References Cited

U.S. PATENT DOCUMENTS

| | | | |
|---|---|---|---|
| 2012/0083209 A1 | 4/2012 | Giles | |
| 2012/0237053 A1 | 9/2012 | Alam | |
| 2013/0303096 A1* | 11/2013 | Foster | H04R 1/1091 455/149 |
| 2014/0037104 A1* | 2/2014 | Seo | H04R 3/00 381/77 |
| 2015/0189421 A1 | 7/2015 | Chou | |
| 2015/0217191 A1* | 8/2015 | Yan | A63F 13/235 463/37 |
| 2015/0249882 A1* | 9/2015 | Patil | G10L 15/26 381/123 |
| 2015/0351142 A1 | 12/2015 | Seymour | |
| 2017/0215213 A1* | 7/2017 | Lee | H04B 17/318 |
| 2018/0088897 A1* | 3/2018 | Mathur | H04R 5/033 |

FOREIGN PATENT DOCUMENTS

| | | |
|---|---|---|
| WO | 2012/170254 | 12/2012 |
| WO | 2012170254 | 12/2012 |

OTHER PUBLICATIONS

Plantronics Honored With Five CES Innovation Awards; Award-Winning Mobile, Office and Gaming Headsets Set—Stage for Plantronics' Product Showcase at CES 2007 31:2 Newswire (Dec. 12, 2006) ittp://www.pmewswiracominews-releases/plantronics-honored-with-five-ces-innovation-awards-56166522.html.

Type with Light on Logitech's New Solar Keyboard for Mac, iPad and iPhone; With One Button, You Can Switch Between Typing on Three Apple Devices 'Press Release, May 30, 2012 http://www.logitech.com/en-us/press/press-releases/9986.

* cited by examiner

WIRELESS AUDIO SOURCE SWITCHING

CROSS-REFERENCE TO RELATED APPLICATION(S)

This application claims the benefit of priority to European Patent Application No. 16176287.7, filed Jun. 24, 2016, and U.S. Provisional Application No. 62/354,649, filed Jun. 24, 2016, both of which are incorporated herein by reference in their entirety.

BACKGROUND

This specification relates to wireless audio output devices.

Some wireless communications protocols operate by designating devices as either a master device or a slave device. Thus, in any pair of communicating devices, one device is the master and the other device is the slave. For example, in the Bluetooth® wireless technology standard maintained by the Bluetooth Special Interest Group of Kirkland, Wash., a master device can establish connections with up to seven slave devices simultaneously. However, a slave device can only connect to one master device at a time.

A master device and its connected slave devices is referred to as a piconet. It is possible for multiple piconets to be linked together, which is referred to as a scatternet.

Establishing a Bluetooth connection starts in an inquiry phase, in which a device transmits an inquiry request. Devices that listen for inquiries are referred to as being in a discoverable state. All devices that receive the inquiry respond with their address.

A device can become a master device during a paging phase. During the paging phase, two devices synchronize their clocks. One device sends a sequence of paging messages and listens for a response from another device. A device that is listening for paging messages is referred to as being in a connectable state. If another device responds, the first device becomes the master device of the connection and the responding device becomes the slave.

After synchronizing during the paging phase, the devices establish an Asynchronous Connection-Less (ACL) connection, which is a low-level communications protocol that carries all data of higher levels of the Bluetooth network protocol stack.

After establishing the ACL connection, the devices open a Logical Link Control and Adaption (L2CAP) channel. The devices can use the L2CAP channel to perform service discovery in order to perform pairing and to discover supported profiles and features of the master device.

Upon first establishing a connection, two devices may undergo a pairing process. During the pairing process, the sink device sends a pairing request to the master device. The sink device then prompts a user to enter a personal identification number (PIN) at the master device to complete the pairing process.

Once pairing has been completed, the sink device can store the address of the master device in a list of trusted devices that have successfully been paired with the sink device. The list of trusted devices thus maintains an address for each paired master device as well as an associated index for each paired master device. The sink device can then skip the pairing process for any master device that occurs in the list of trusted devices.

The Bluetooth standard defines a number of application profiles that specify services that are offered by a Bluetooth-enabled device. A single device can support multiple profiles. Common profiles include an Advanced Audio Distribution Profile (A2DP), which defines how audio data can be streamed from one device to another; an Audio Video Remote Control Profile (AVRCP), which provides an interface for controlling televisions and other audio/video equipment; and a Hands Free Profile (HFP), which is used to communicate with hands-free sink devices. The devices can open one or more L2CAP channels to support one or more of the supported profiles.

SUMMARY

This specification describes a wireless audio output sink device that can switch between multiple audio source devices using dedicated user interface controls.

Particular embodiments of the subject matter described in this specification can be implemented so as to realize one or more of the following advantages. A sink device can implement intent-based switching that honors the intent of the user in determining which audio source from which to receive audio data. A user can easily and quickly switch between multiple audio source devices with very little user input. After requesting a switch, the user need not provide any additional input to the sink device or any of the source devices to begin receiving audio data at the sink device. A sink device can switch between multiple different activities of a single audio source device. A sink device does not switch to other sources when a connected source device becomes unavailable.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes an audio sink device with user intent-based switching capability. This means that a user can cause the audio sink device to switch between multiple wirelessly connected source devices using user input, which can be one or more dedicated user interface controls. A "sink device" is an audio output device that is configured to wirelessly receive audio data from a source device using a wireless communications protocol. Common sink devices include wireless headphone sets and standalone wireless speakers.

In this specification, a dedicated user interface control means a user input mechanism that maps user input to a particular source device. For example, a dedicated user interface control can be a physical button, toggle, dial, or switch. The dedicated user interface control can also be a soft user interface control that corresponds to a particular activated area of a presence-sensitive surface or display.

Figure 1:
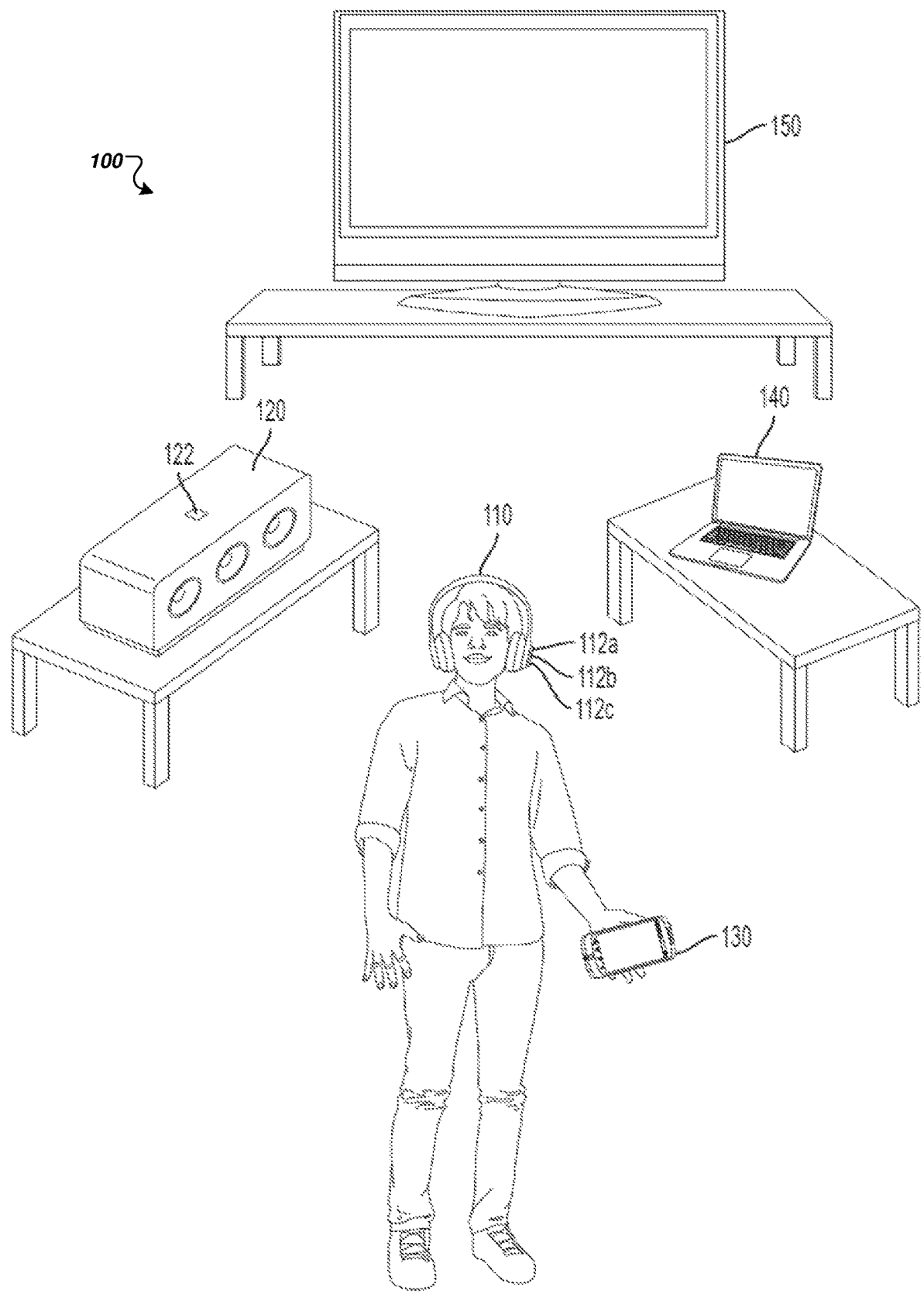
FIG. 1 is a diagram of an example system.

FIG. 1 is a diagram of an example system 100. The system 100 includes two sink devices: a headphone set 110 and a wireless speaker set 120. The system 100 also includes three source devices: a mobile phone 130, a laptop computer 140, and a television 150.

The source devices 130, 140, and 150 are devices that can use a short- to mid-range wireless communication protocol, e.g., Bluetooth, to provide audio data to one or more sink devices.

The wireless headphone set 110 has integrated buttons 112a-c that are dedicated user interface controls for switching between source devices, e.g., the source devices 130, 140, and 150. For example, if a user presses the button 112a, the headphone set 110 can switch to receiving audio data from the mobile phone 130. If the user presses the button 112b, the headphone set 110 can switch to receiving audio data from the laptop computer 140. If the user presses the button 112c, the headphone set 110 can switch to receiving audio data from the television 150.

The wireless speaker set 120 has another type of integrated user interface control: a toggle button 122. The toggle button 122 can be used to cycle through connected source devices. For example, if the wireless speaker set 120 is connected to the television 150, the wireless speaker set 120 can switch to receiving audio data from the mobile phone 130 when the toggle button 122 is pressed.

Figure 2:
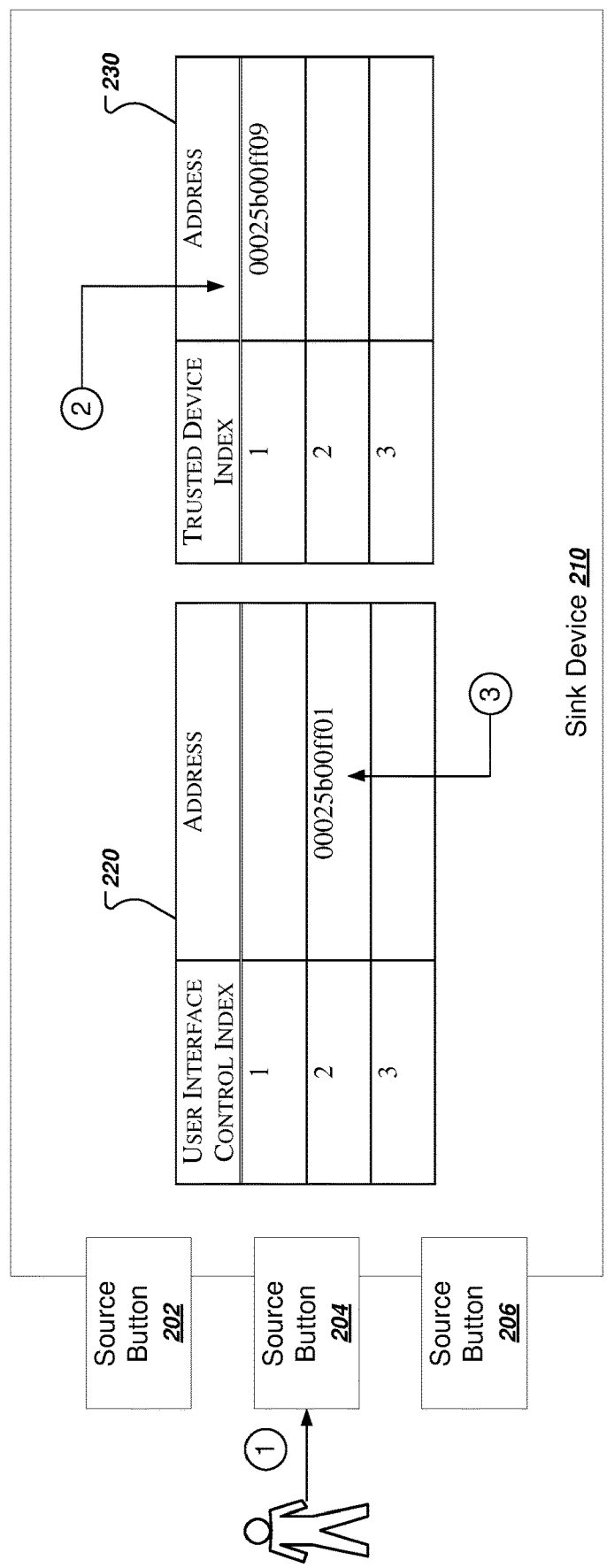
FIG. 2 is a flow chart of an example process for assigning a dedicated user interface control to one of multiple audio source devices.

FIG. 2 illustrates components of an example sink device 210. The sink device 210 has three dedicated user interface controls: a first source button 202, a second source button 204, and a third source button 206.

The sink device 210 has a switching device table 220 that associates user interface control indexes with addresses of corresponding source devices. The sink device 210 also has a trusted device table 230 that associates trusted device indexes with addresses of corresponding source devices.

A user can associate one of the dedicated user interface controls during a pairing process. The sink device 210 can be configured to distinguish user input that requests pairing with a new audio source device and user input that requests switching to a particular audio source device. For example, the sink device 210 can interpret a short press of a button, e.g., less than 1 second, as a request to switch to an audio source device associated with the button and can interpret a long press of the same button, e.g., 1 second or more, as a request to pair with a new audio source device to be associated with the button.

Thus, during state 1, a user can provide a long press on the second source button 204. The sink device 210 interprets this user input as a request to associate the second source button 204 with a new audio source device.

The sink device 210 then pairs with the new audio source device. This process is described in more detail below with reference to FIG. 3.

After pairing, the sink device 210 considers the paired audio source device to be a trusted device. During state 2, the sink device 210 stores the address of the new audio source device in the trusted device table 230. During state 3, the sink device 210 stores the address of the new audio source device in the switching device table 220, which associates the address of the new audio source device with a user interface control index of the second source button 204.

In some implementations, the sink device can associate each of the dedicated user interface controls with a particular activity on a source device. Thus, a single source device can be associated with multiple user interface controls.

For example, a tablet computer can provide multiple sources of audio information to a sink device that each correspond to a particular activity, e.g., music player audio, cinematic audio, and system notification audio. A user can associate each activity with a user interface control, e.g., one of the source buttons 202, 204, or 206.

For example, a user can associate music player audio with the first source button 202 and cinematic audio with the second source button 204. The user can explicitly select the source button corresponding to desired activity.

To associate a particular activity of a device, the sink device 210 can store a additional column attribute in the switching device table. The additional column attribute corresponds to an activity identifier for a particular activity. Thus, some rows of the switching device table 220 will refer to the same address but different activity identifiers.

This additional information may need to be configured by software running on the source device that provides an activity identifier to the sink device 210. For example, a mobile phone can install an application that enumerates the different activities. Then, during the pairing process, a user can use the application to cause the phone to provide particular activity identifiers to the sink device 210. The sink device 210 then stores the received activity identifiers in the switching device table 220.

Figure 3:
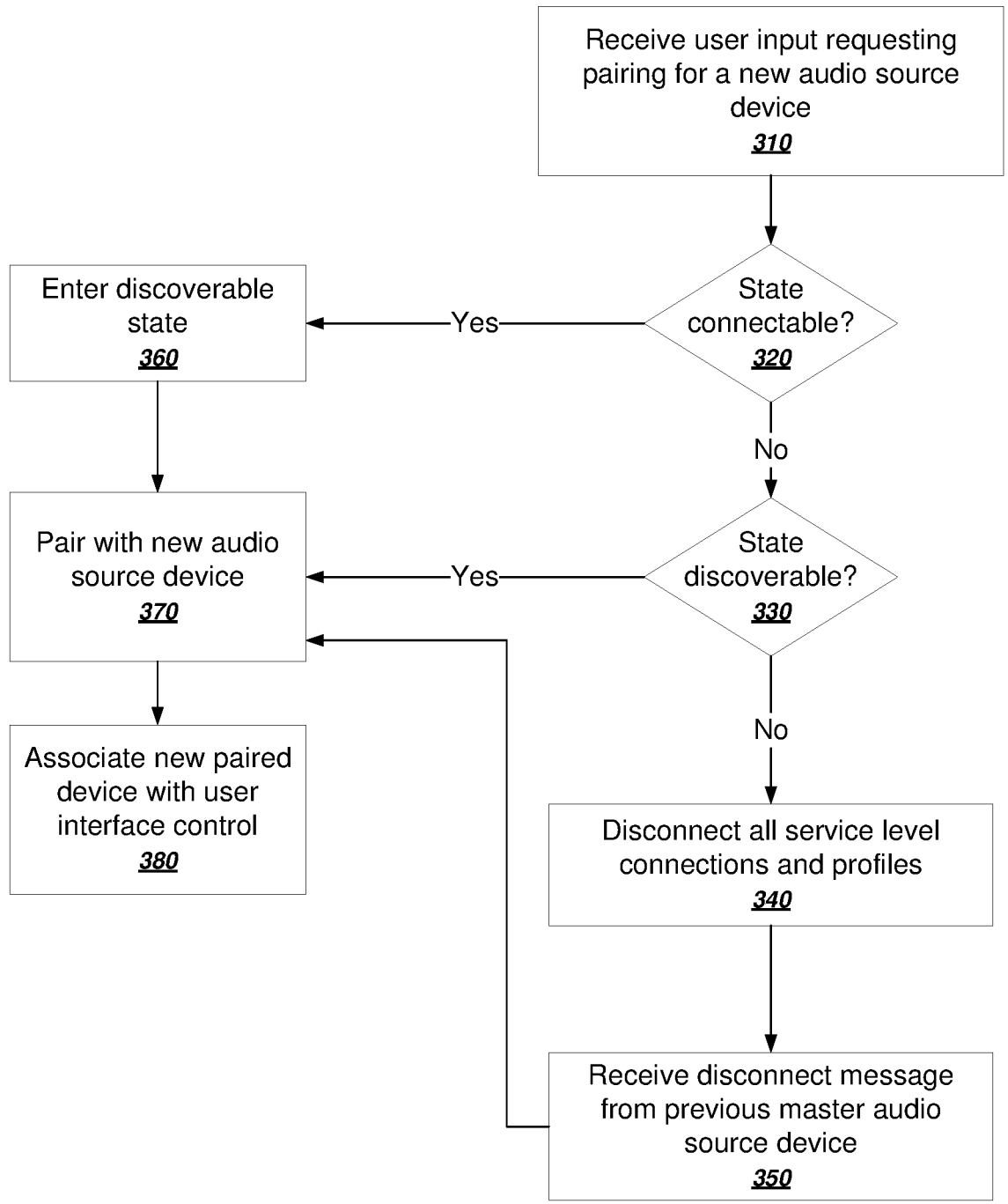
FIG. 3 is a flow chart of an example process for a sink device to switch to a new source device.

FIG. 3 is a flow chart of an example process for assigning a dedicated user interface control to one of multiple audio source devices. The process can be performed by an appropriately programmed wireless audio output device comprising one or more computers. For convenience, the process will be described as being performed by an embedded computer or logic circuitry in a sink device. Typically the audio output device will perform the example process for each of multiple master audio source devices.

The sink device receives user input requesting pairing for a new audio source device (310).

The sink device determines whether its state is connectable (320). A sink device is in a connectable state when it is listening for paging messages from potential master devices trying to establish connections. If the sink device is in a connectable state, the sink device enters a discoverable state (branch to 360).

In the discoverable state, the sink device listens for inquiries from master devices. The connectable state and the discoverable state are not mutually exclusive. Thus, the sink device may already be in the discoverable state. In other words, in step 360 the sink device ensures that it is in the discoverable state in order to discover any new audio source devices that are within range.

The responsiveness of the sink device can be improved by exiting the connectable state so that the sink device is no longer scanning for paging messages. Thus, in some implementations, when entering the discoverable state (360), the sink device exits the connectable state.

After entering the discoverable state (360), the sink device pairs with the new audio source device (370). To pair with the new audio source device, the sink device enters a discoverable state to provide its address to the new audio source device. The sink device then enters a connectable state to synchronize with the new audio source device. In some implementations, the sink device does not require a pairing code in order to pair with the new audio source device.

If the state of the sink device is not connectable (320), the sink device determines whether its state is discoverable (branch to 330). If so, the sink device is ready to pair with new source devices. Thus, the sink device can then pair with the new audio source device (branch to 380).

If the state of the sink device is not discoverable (330), the sink device likely has already has an established connection with a previous master audio source device, and such connection needs to be torn down before pairing with the new audio source device.

Thus, if the state of the sink device is not discoverable (330), the sink device disconnects all service level connections and all profiles (branch to 340). For example, the sink device can disconnect the ACL and L2CAP connections with the previous master audio source device as well as disconnect all A2DP and AVRCP profiles.

When these disconnections occur, the sink device will receive a disconnect message from the previous master audio source device (350). Upon receiving the disconnect message, the sink device can then pair with the new audio source device (370).

After being paired, the sink device associates the new paired device with the selected user interface control (380). For example, the sink device can directly associate the address of the new paired device with a user interface control index corresponding to the selected user interface control. For example, if the sink devices has multiple buttons, each button can be assigned a respective user interface control index. The sink device can associate each user interface control index with the address of a corresponding paired device in a switching device table.

Table 1 illustrates an example switching device table that associates user interface control indexes with addresses.

TABLE 1

| USER INTERFACE CONTROL INDEX | ADDRESS |
| --- | --- |
| 1 | 00025b00ff06 |
| 2 | 00025b00ff01 |
| 3 | 00025b00ff09 |

Thereafter, when the sink device receives user input at a user interface control that requests switching to receiving audio from the new paired device, the sink device can use the switching device table to obtain the address of the new paired device.

However, in some cases, fewer modifications to the wireless protocol stack are required if the sink device also maintains a trusted device table that associates trusted device indexes to addresses. After being paired, the standard libraries of some wireless communication protocols maintain a trusted device table. When using these libraries, the sink device assigns a trusted device index for the new paired device and associates the address of the new paired device with the corresponding trusted device index.

Subsequent interactions with the wireless protocol stack use the trusted device index as input to the application programming interfaces (APIs) of the standard libraries. Thus, instead of using the address of the connected devices to perform various operations, the sink device can use the trusted device index.

Table 2 illustrates an example trusted device table that associates trusted device indexes to addresses:

TABLE 2

| TRUSTED DEVICE INDEX | ADDRESS |
| --- | --- |
| 1 | 00025b00ff09 |
| 2 | 00025b00ff06 |
| 3 | 00025b00ff01 |

The sink device can obtain a trusted device index given a user interface control index by comparing the entries in the tables. This process is described in more detail below with reference to FIG. 7.

The sink device can then optionally store the trusted device table and the switching device table in persistent storage integrated with the sink device. By storing the trusted device table and the switching device table in persistent storage, the device need not undergo pairing processes after a restart.

Figure 4:
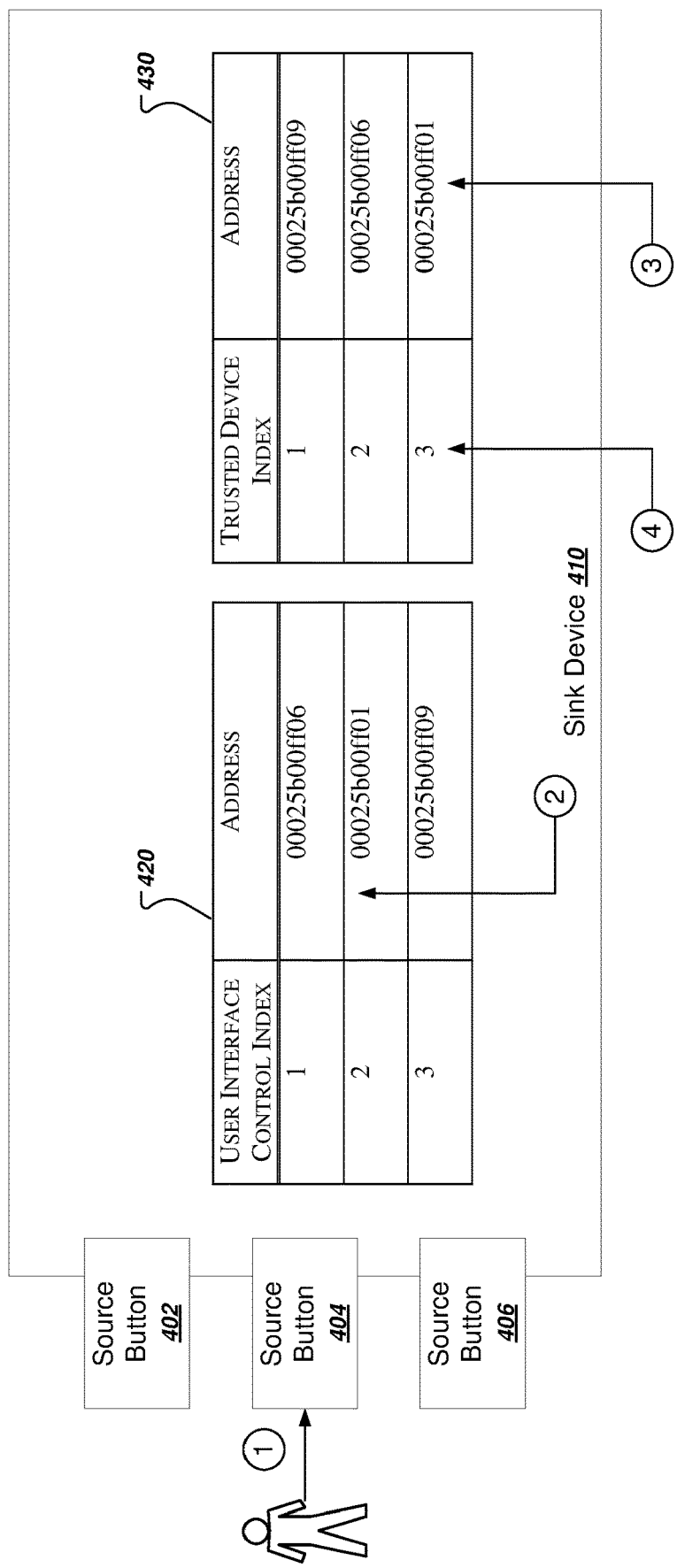
FIG. 4 is a flow chart of an example process for a sink device to connect to a new audio source device.

FIG. 4 illustrates components of an example sink device 410. The sink device 410 has three dedicated user interface controls: a first source button 402, a second source button 404, and a third source button 406.

The sink device 410 has a switching device table 420 that associates user interface control indexes with addresses of corresponding source devices. The sink device 410 also has a trusted device table 430 that associates trusted device indexes with addresses of corresponding source devices.

A user can cause the sink device to switch to a new audio source device by pressing any of the source buttons 402, 404, or 406.

For example during state 1, the user can press the second source button 404. During state 2, the sink device 410 can use a user interface control index corresponding to the selected second source button 404 as an index into the switching device table 420 to obtain the address of the requested audio source device.

During state 3, the sink device 410 searches the trusted device table 430 for a matching address. During state 4, after finding the matching address, the sink device 410 obtains the trusted device index of the requested audio source device. The sink device 410 can then use the trusted device index to connect to the requested audio source device.

If the sink device 410 was configured to switch between particular activities of a single source device, the sink device 410 will use an activity identifier stored in the switching device table 420 when establishing the connection with the requested audio source device. However, if the sink device 410 is already connected to the audio source device, the sink device 410 may not need to establish a new connection with the requested source device.

Figure 5:
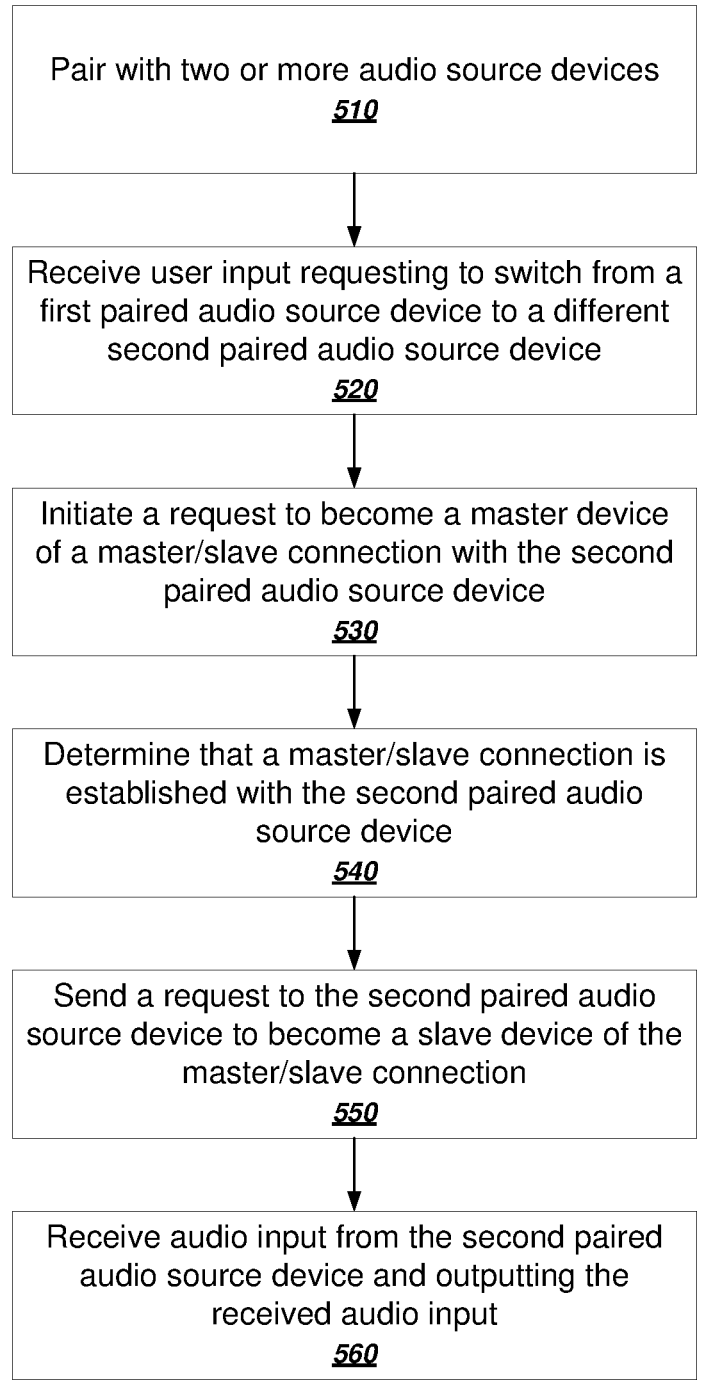
FIG. 5 is a flow chart of an example process for a sink device to switch to a new source device.

FIG. 5 is a flow chart of an example process for a sink device to switch to a new source device. The process can be performed by an appropriately programmed wireless audio output device comprising one or more computers. For convenience, the process will be described as being performed by an embedded computer or logic circuitry in a sink device.

The sink device pairs with two or more audio source devices (510). For example, the sink device can use the process described above with reference to FIGS. 2-3 for each of multiple audio source devices.

The sink device receives user input requesting to switch from a first paired audio source device to a different second paired audio source device (520). When a request to switch devices is received by the sink device, the sink device will typically be a slave device of a master/slave connection with the first paired audio source device.

The sink device can receive the user input at a dedicated user interface control. The sink device can also receive the user input as a voice command. The sink device can then determine a paired audio source device corresponding to the user input.

As described above, in some cases fewer modifications to the wireless protocol software stack are required if the sink device maintains a switching device table and a separate trusted device table. The sink device can then obtain the trusted device index for a particular user input using both tables. To do so, the sink device obtains a user interface control index of the dedicated user interface control. The sink device then searches a switching device table with the user interface control index to obtain an address of the second paired audio source device. After obtaining the address of the second paired audio source device, the sink device searches a trusted device table to obtain a trusted device index of the second paired audio source device. For example, the system can compare the address of the second paired audio source device with each entry in the trusted device table. Upon finding a matching entry, the sink device can use the trusted device index of the matching entry as the trusted device index of the second paired audio source device.

The sink device initiates a request to become a master device of a master/slave connection with the second paired audio source device (530). As described above, to become the master device the sink device can send paging messages and wait for a response from the second paired audio source device. The sink device can then establish the connection with the second paired audio source device.

The sink device can then use the trusted device index to establish a connection with the second paired audio source device. However, the sink device need not use the trusted device index to establish such a connection. In some implementations, the sink device can use the address of the second paired audio source device directly. In addition, the sink device need not use two separate tables to obtain the trusted device index. In some implementations, the sink device can directly associate the user interface control index with a corresponding trusted device index.

The sink device determines that a master/slave connection is established with the second paired audio source device (540).

The sink device sends a request to the second paired audio source device to become a slave device of the master/slave connection (550). In other words, the sink device sends a request to exchange roles in the connection with the second paired audio source device.

Figure 6:
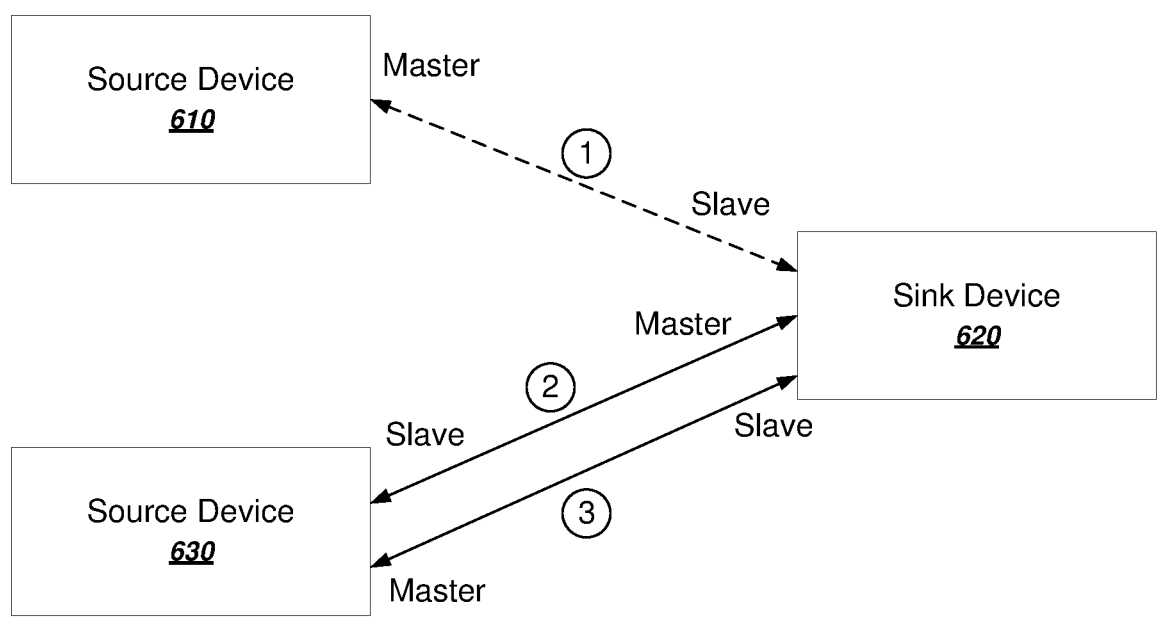
FIG. 6 illustrates an example switch by a sink device between two source devices.

FIG. 6 illustrates an example switch by a sink device 620 between two source devices 610 and 630. During state 1, the sink device 620 is a slave device of a master/slave connection with the first source device 610. During state 2, the sink device initiates a connection as a master with the second source device 630. During state 3, the sink device 620 requests an exchange, and the sink device 620 becomes the slave device of the connection with the second source device 630.

As shown in FIG. 5, upon exchanging roles, the sink device begins receiving audio input from the second paired audio source device and outputting the received audio input (560). Because the sink device was already paired to multiple master devices, the switch to the second paired audio source device requires no further user input after the initial request. For example, if the user interface control is a button, a user can switch audio source devices by simply pressing the button on the sink device. The sink device then seamlessly switches to the second audio source device without any further input by the user at the sink device or at any of the audio source devices.

To illustrate the functionality, consider a use case in which a user pairs the sink device with a television, a tablet computer, and a mobile phone. The sink device has three buttons that are assigned respectively to these three devices.

To listen to the television, the user simply presses a first button on the sink device. The connection is established to the television and the other devices are not impacted. To listen to the tablet computer, the user presses a second button on the sink device. The sink device terminates the connection with the television and connects to the tablet computer. The television reacts to the disconnection by resuming a previous audio playback state. The mobile phone is not impacted.

To listen to the mobile phone, the user presses a third button on the sink device. The sink device terminates the connection with the tablet computer and connects with the mobile phone.

Figure 7:
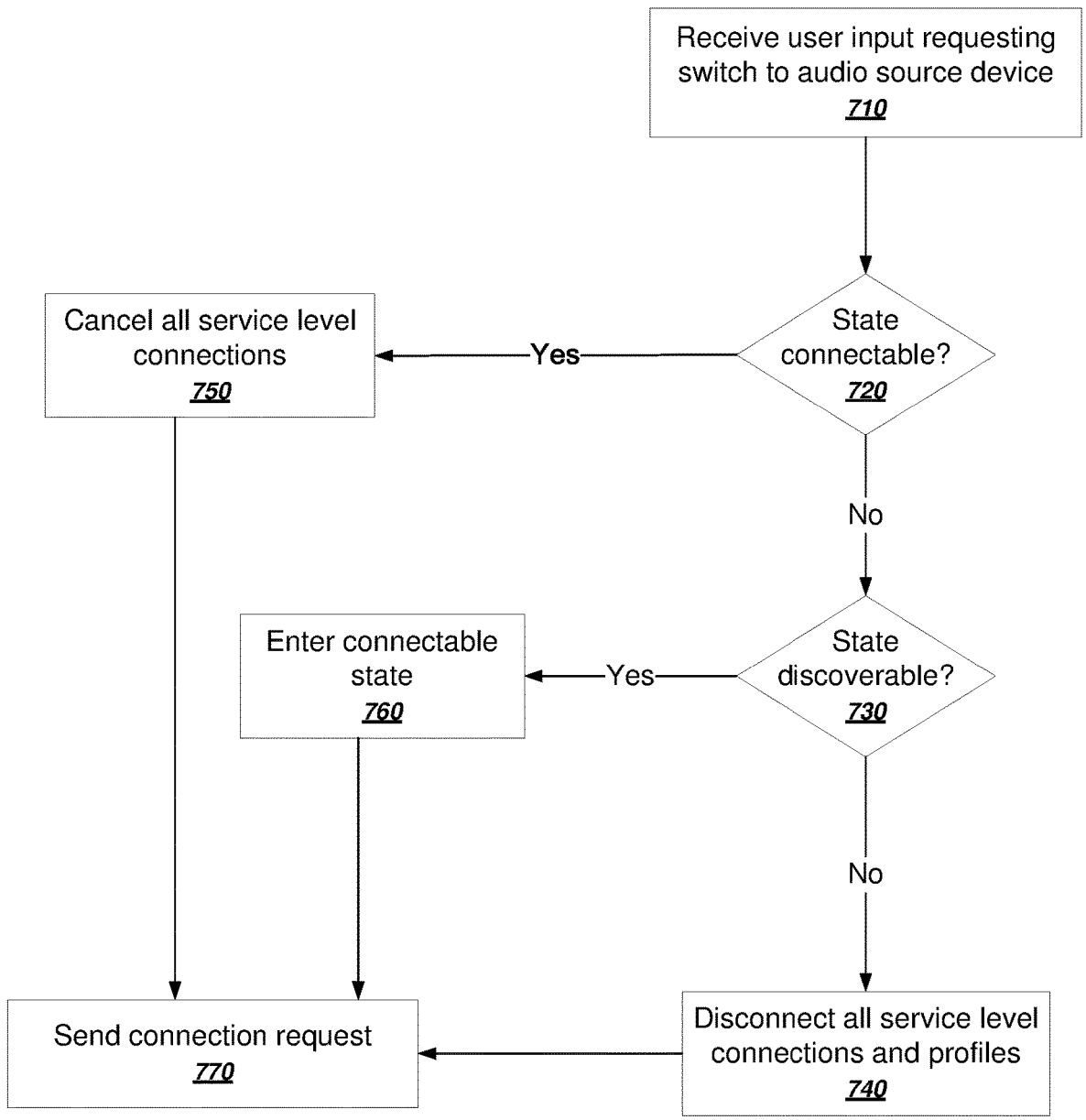
FIG. 7 is a flow chart of an example process for a sink device to connect to a new audio source device.

FIG. 7 is a flow chart of an example process for a sink device to connect to a new audio source device. The process can be performed by an appropriately programmed wireless audio output device comprising one or more computers. For convenience, the process will be described as being performed by an embedded computer or logic circuitry in a sink device.

The sink device receives user input requesting a switch to an audio source device (710). For example, the sink device can receive the user input at a dedicated user interface control. In some implementations, the sink device determines a trusted device index for the requested audio source device, e.g., as described above with reference to FIGS. 2-3. The sink device can then use the trusted device index to interact with the corresponding audio source device.

The sink device determines whether its state is connectable (720). If so, the sink device cancels all service level connections (branch to 750). In doing so, the sink device clears random access memory space occupied by one or more previous connections.

The sink device then sends a connection request to the audio source device (770). As described above with reference to FIG. 5, the sink device can initiate the connection as a master device, and then send a request to exchange roles with the audio source device.

If the state of the sink device was not connectable (720), the sink device determines whether its state is discoverable (branch to 730). If so, the sink device enters the connectable state (760) and sends a connection request to the audio source device (770).

If the state of the sink device was not discoverable (730), the sink device disconnects all service level connections and profiles (branch to 740) and sends a connection request to the audio source device (770). By disconnecting all service level connections and profiles, the sink device can clear memory that was occupied by one or more previous connections.

Figure 8:
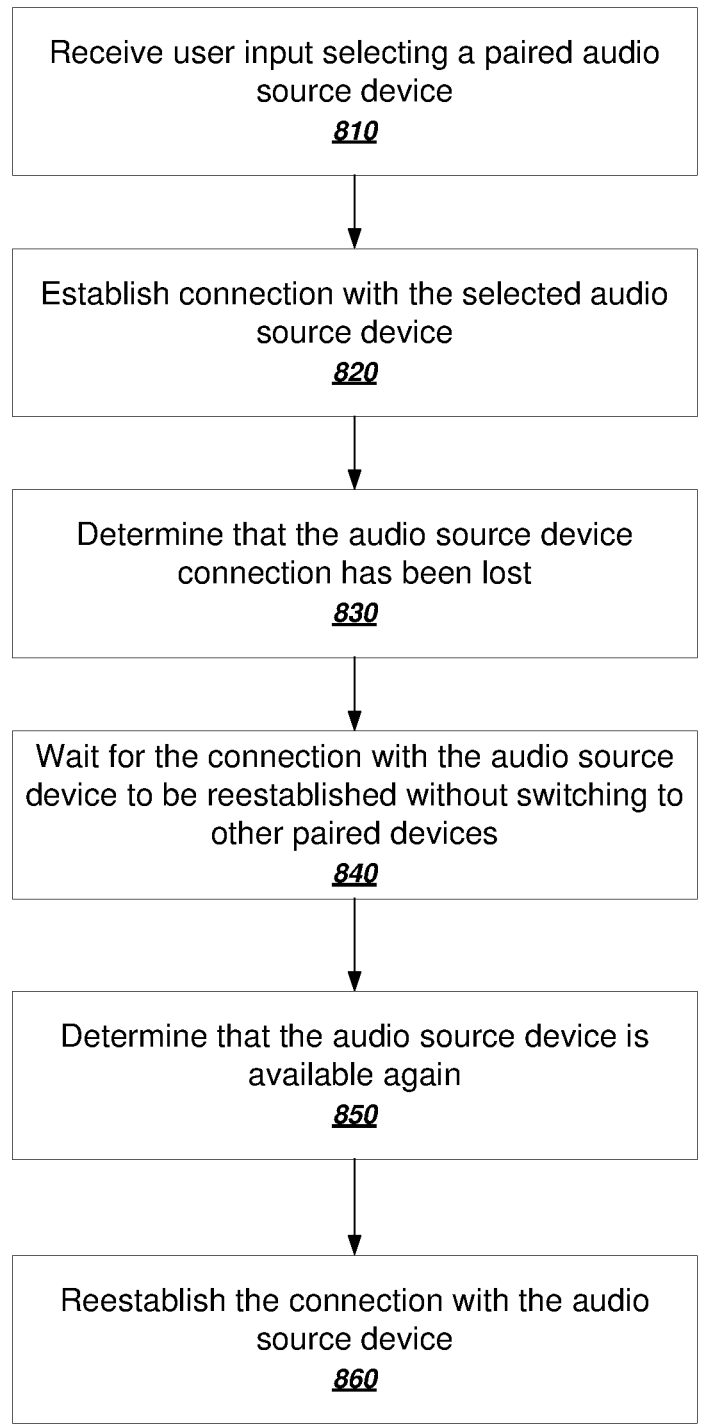
FIG. 8 is a flow chart of an example process for handling disconnections by a sink device.

FIG. 8 is a flow chart of an example process for handling disconnections by a sink device. The process can be performed by an appropriately programmed wireless audio output device comprising one or more computers. For convenience, the process will be described as being performed by an embedded computer or logic circuitry in a sink device.

The sink device receives user input selecting a paired audio source device (810). Generally, the sink device will have multiple paired audio source devices. The sink device can store the addresses of the paired audio source devices in a trusted device table as describe above.

The sink device establishes a connection with the selected audio source device (820).

The sink device determines that the connection with the audio source device has been lost (830). The connection can be lost for any of a number of reasons. For example, the audio source device can go out of range, encounter electromagnetic interference, or lose power.

The sink device waits for the connection with the audio source device to be reestablished without switching to other paired devices (840). In other words, instead of searching for a most-recently connected device or searching through the trusted device table for a next paired audio source device to connect with, the intent-based switching mechanism of the sink device means that the sink device waits for the device to reconnect. In some implementations, the sink device does not connect to another source device without explicit user input that selects another source device.

The sink device determines that the audio source device is available again (850). For example, the audio source device can power back on or come back into range.

The sink device reestablishes the connection with the audio source device (860). The sink device can automatically request to establish a connection as a master device and then request to switch roles, as describe above with reference to FIGS. 5-6.

After reestablishing the connection, the sink device can again receive audio input from the connected audio source device.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, headphone sets, portable speakers, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

Various aspects of the present invention may be appreciated from the following enumerated example embodiments (EEEs):

EEE 1. A wireless audio headset comprising one or more audio output devices, a plurality of dedicated user interface controls, one or more data processing apparatus and one or more storage devices storing instructions that are operable, when executed by the one or more data processing apparatus, to cause the one or more data processing apparatus to perform operations comprising:
  receiving an indication of user input selecting one of the dedicated user interface controls, wherein the selected dedicated user interface control corresponds to one of a plurality of paired audio source devices that are paired with the wireless audio headset, wherein the wireless audio headset is a slave device of a first master/slave connection with a first paired audio source device of the plurality of paired audio source devices;
  identifying a second paired audio source device corresponding to the selected user interface control;
  initiating a request to become a master device of a second master/slave connection with the second paired audio source device corresponding to the selected user interface control;
  determining that the second master/slave connection has been established with the second paired audio source device;
  in response to the determining, sending, by the wireless audio headset to the second paired audio source device, a request to become a slave device of the second master/slave connection;
  receiving, by the wireless audio headset, audio input from the second paired audio source device and outputting the received audio input on the one or more audio output devices.

EEE 2. The wireless audio headset of EEE 1, wherein the plurality of dedicated user interface controls are a plurality of physical buttons, each button of the plurality of buttons being assigned to a respective paired audio source devices of the plurality of paired audio source devices.

EEE 3. The wireless audio headset of EEE 1 or EEE 2, wherein no further user input is received by the wireless audio sink device after receiving the user input selecting the user interface control.

EEE 4. The wireless audio headset of EEE 3, wherein no user input is received by any of the plurality of paired audio source devices.

EEE 5. The wireless audio headset of any preceding EEE, wherein identifying the second paired audio source device corresponding to the selected user interface control comprises:
  identifying a user interface control index corresponding to the user interface control;
  identifying a wireless protocol address associated with the user interface control index;
  searching a trusted device table for an entry having the wireless protocol address; and
  identifying a trusted device index corresponding to the second paired audio source device; and
  using the trusted device index to initiate the request to become a master device of a second master/slave connection with the second paired audio source device.

EEE 6. The wireless audio headset of any preceding EEE, wherein the operations further comprise maintaining a separate switching device table that associates user interface control indexes with wireless protocol addresses.

EEE 7. The wireless audio headset of any preceding EEE, wherein the operations further comprise storing, in a persistent data store integrated with the wireless audio headset, the switching device table that associates user interface control indexes with wireless protocol addresses.

EEE 8. The wireless audio headset of any preceding EEE, wherein the operations further comprise:
  determining that a connection with an audio source device has been lost; and
  switching to another paired audio source if and only if further user input selecting a different audio source device is received.

EEE 9. The wireless audio headset of EEE 8, wherein the operations further comprise:
  determining that the audio source device is available again; and
  in response, automatically reestablishing a connection with the audio source device.

EEE 10. The wireless audio headset of any preceding EEE, wherein the operations further comprise:
  identifying a particular activity identifier of the second paired audio source device corresponding to the selected user interface control; and providing, to the second paired audio source device, the particular activity identifier, and
  wherein receiving the audio input from the second paired audio source device comprises receiving audio input corresponding to the particular activity identifier.

EEE 11. A method comprising:
  receiving, at a wireless audio sink device, user input selecting a user interface control of the wireless audio sink device, the user interface control corresponding to one of a plurality of paired audio source devices, wherein the wireless audio sink device is a slave device of a first master/slave connection with a first paired audio source device of the plurality of paired audio source devices;
  identifying, by the wireless audio sink device, a second paired audio source device corresponding to the selected user interface control;
  initiating, by the wireless audio sink device, a request to become a master device of a second master/slave connection with the second paired audio source device corresponding to the selected user interface control;
  determining, by the wireless audio sink device, that the second master/slave connection has been established with the second paired audio source device;
  in response to the determining, sending, by the wireless audio sink device to the second paired audio source device, a request to become a slave device of the second master/slave connection; and
  receiving, by the wireless audio sink device, audio input from the second paired audio source device and outputting the received audio input.

EEE 12. The method of EEE 11, wherein no further user input is received by the wireless audio sink device after receiving the user input selecting the user interface control.

EEE 13. The method of EEE 11 or EEE 12, wherein no user input is received by any of the plurality of paired audio source devices.

EEE 14. The method of any one of EEEs 11 to 13, wherein identifying the second paired audio source device corresponding to the selected user interface control comprises:
  identifying a user interface control index corresponding to the user interface control;
  identifying a wireless protocol address associated with the user interface control index;
  searching a trusted device table for an entry having the wireless protocol address; and
  identifying a trusted device index corresponding to the second paired audio source device; and
  using the trusted device index to initiate the request to become a master device of a second master/slave connection with the second paired audio source device.

EEE 15. The method of any one of EEEs 11 to 14, further comprising maintaining a separate switching device table that associates user interface control indexes with wireless protocol addresses.

EEE 16. The method of any one of EEEs 11 to 15, further comprising storing, in a persistent data store integrated with the sink device, the switching device table that associates user interface control indexes with wireless protocol addresses.

EEE 17. The method of any one of EEEs 11 to 16, wherein the user interface control is a physical button of a plurality of physical buttons of the sink device, each button of the plurality of buttons being assigned to a respective paired audio source devices of the plurality of paired audio source devices.

EEE 18. The method of any one of EEEs 11 to 16, wherein the user interface control is a physical user interface of the sink device that cycles through the plurality of paired audio source devices in response to subsequent user inputs.

EEE 19. The method of any one of EEEs 11 to 18, further comprising:
  determining, by the wireless audio sink device, that a connection with an audio source device has been lost; and
  switching, by the wireless audio sink device, to another paired audio source if and only if further user input selecting a different audio source device is received.

EEE 20. The method of EEE 19, further comprising:
  determining, by the wireless audio sink device, that the audio source device is available again; and
  in response, automatically reestablishing a connection with the audio source device.

EEE 21. The method of any one of EEEs 11 to 20, further comprising:
  identifying, by the wireless audio sink device, a particular activity identifier of the second paired audio source device corresponding to the selected user interface control; and
  providing, to the second paired audio source device, the particular activity identifier, and
  wherein receiving, by the wireless audio sink device, the audio input from the second paired audio source device comprises receiving audio input corresponding to the particular activity identifier.

EEE 22. A wireless audio sink device comprising one or more audio output devices, a plurality of dedicated user interface controls, one or more data processing apparatus and one or more storage devices storing instructions that are operable, when executed by the one or more data processing apparatus, to cause the one or more data processing apparatus to perform operations comprising:
  receiving, at the wireless audio sink device, user input selecting a user interface control of the wireless audio sink device, the user interface control corresponding to one of a plurality of paired audio source devices, wherein the wireless audio sink device is a slave device of a first master/slave connection with a first paired audio source device of the plurality of paired audio source devices;
  identifying, by the wireless audio sink device, a second paired audio source device corresponding to the selected user interface control;
  initiating, by the wireless audio sink device, a request to become a master device of a second master/slave connection with the second paired audio source device corresponding to the selected user interface control;
  determining, by the wireless audio sink device, that the second master/slave connection has been established with the second paired audio source device;
  in response to the determining, sending, by the wireless audio sink device to the second paired audio source device, a request to become a slave device of the second master/slave connection; and
  receiving, by the wireless audio sink device, audio input from the second paired audio source device and outputting the received audio input on the one or more audio output devices.

EEE 23. The wireless audio sink device of EEE 22, wherein no further user input is received by the wireless audio sink device after receiving the user input selecting the user interface control.

EEE 24. The wireless audio sink device of EEE 22 or EEE 23, wherein no user input is received by any of the plurality of paired audio source devices.

EEE 25. The wireless audio sink device of any one of EEEs 22 to 24, wherein identifying the second paired audio source device corresponding to the selected user interface control comprises:
 identifying a user interface control index corresponding to the user interface control;
 identifying a wireless protocol address associated with the user interface control index;
 searching a trusted device table for an entry having the wireless protocol address; and
 identifying a trusted device index corresponding to the second paired audio source device; and
 using the trusted device index to initiate the request to become a master device of a second master/slave connection with the second paired audio source device.

EEE 26. The wireless audio sink device of any one of EEEs 22 to 25, wherein the operations further comprise maintaining a separate switching device table that associates user interface control indexes with wireless protocol addresses.

EEE 27. The wireless audio sink device of any one of EEEs 22 to 26, wherein the operations further comprise storing, in a persistent data store integrated with the sink device, the switching device table that associates user interface control indexes with wireless protocol addresses.

EEE 28. The wireless audio sink device of any one of EEEs 22 to 27, wherein the user interface control is a physical button of a plurality of physical buttons of the sink device, each button of the plurality of buttons being assigned to a respective paired audio source devices of the plurality of paired audio source devices.

EEE 29. The wireless audio sink device of any one of EEEs 22 to 27, wherein the user interface control is a physical user interface of the sink device that cycles through the plurality of paired audio source devices in response to subsequent user inputs.

EEE 30. The wireless audio sink device of any one of EEEs 22 to 29, wherein the operations further comprise:
 determining, by the wireless audio sink device, that a connection with an audio source device has been lost; and
 switching, by the wireless audio sink device, to another paired audio source if and only if further user input selecting a different audio source device is received.

EEE 31. The wireless audio sink device of EEE 30, wherein the operations further comprise:
 determining, by the wireless audio sink device, that the audio source device is available again; and
 in response, automatically reestablishing a connection with the audio source device.

EEE 32. The wireless audio sink device of any one of EEEs 22 to 31, wherein the operations further comprise:
 identifying, by the wireless audio sink device, a particular activity identifier of the second paired audio source device corresponding to the selected user interface control; and
 providing, to the second paired audio source device, the particular activity identifier, and
 wherein receiving, by the wireless audio sink device, the audio input from the second paired audio source device comprises receiving audio input corresponding to the particular activity identifier.

EEE 33. A computer storage medium encoded with a computer program, the program comprising instructions that are operable, when executed by data processing apparatus, to cause the data processing apparatus to perform the method of any one of EEEs 11-21.

The invention claimed is:

1. A wireless audio headset comprising one or more audio output devices, a plurality of dedicated user interface controls, one or more data processing apparatus and one or more storage devices storing instructions that are operable, when executed by the one or more data processing apparatus, to cause the one or more data processing apparatus to perform operations comprising:
 receiving an indication of user input selecting one of the plurality of dedicated user interface controls, wherein each of the plurality of dedicated user interface controls is mapped to a different respective previously paired audio source device of a plurality of previously paired audio source devices, wherein the selected dedicated user interface control is mapped to one of the plurality of previously paired audio source devices that are paired with the wireless audio headset, wherein the wireless audio headset is a slave device of a first master/slave connection with a first paired audio source device of the plurality of paired audio source devices;
 initiating a request to become a master device of a second master/slave connection with a second previously paired audio source device corresponding to the selected dedicated user interface control including looking up previously stored identifying information for the second previously paired audio source device and sending one or more messages to the second previously paired audio source device using the previously stored identifying information for the second previously paired audio source device;
 determining that the second master/slave connection has been established with the second previously paired audio source device;
 in response to the determining, sending, by the wireless audio headset to the second previously paired audio source device, a request to become a slave device of the second master/slave connection; and
 receiving, by the wireless audio headset, audio input from the second previously paired audio source device and outputting the received audio input on the one or more audio output devices.

2. The wireless audio headset of claim 1, wherein the plurality of dedicated user interface controls comprise a plurality of physical buttons.

3. The wireless audio headset of claim 1, wherein the wireless audio headset is configured to switch to receiving audio input from the second previously paired audio source device without receiving any further user input after receiving the user input selecting the user interface control.

4. The wireless audio headset of claim 3, wherein the wireless audio headset is configured to switch to receiving audio input from the second previously paired audio source device without any user input being received by any of the plurality of paired audio source devices.

5. The wireless audio headset of claim 1, wherein looking up the previously stored identifying information of the second previously paired audio source device corresponding to the selected dedicated user interface control comprises:
 identifying a user interface control index corresponding to the selected dedicated user interface control;
 identifying a wireless protocol address associated with the user interface control index,
 searching a trusted device table for an entry having the wireless protocol address; and
 identifying a trusted device index corresponding to the second previously paired audio source device and wherein initiating the request comprises using the identified trusted device index to initiate the request to become a master device of a second master/slave connection with the second paired audio source device.

6. The wireless audio headset of claim 1, wherein the operations further comprise maintaining a separate switching device table that associates user interface control indexes with wireless protocol addresses.

7. The wireless audio headset of claim 1, wherein the operations further comprise storing, in a persistent data store integrated with the wireless audio headset, a switching device table that associates user interface control indexes with wireless protocol addresses.

8. The wireless audio headset of claim 1, wherein the operations further comprise:
determining that a connection with an audio source device has been lost; and
switching to another paired audio source after the connection is lost if and only if further user input selecting a different audio source device is received.

9. The wireless audio headset of claim 8, wherein the operations further comprise:
determining that the audio source device is available again; and
in response, automatically reestablishing a connection with the audio source device.

10. The wireless audio headset of claim 1, wherein the operations further comprise:
identifying a particular activity identifier of the second paired audio source device corresponding to the selected dedicated user interface control; and
providing, to the second paired audio source device, the particular activity identifier, and
wherein receiving the audio input from the second paired audio source device comprises receiving audio input corresponding to the particular activity identifier.

11. The wireless audio headset of claim 1, wherein the previously stored identifying information for the second previously paired audio source device comprises a wireless protocol address for the second previously paired audio source device.

12. The wireless audio headset of claim 1, wherein the previously stored identifying information for the second previously paired audio source device comprises a trusted device index for the second previously paired audio source device.

13. A wireless audio sink device comprising one or more audio output devices, a plurality of dedicated user interface controls, one or more data processing apparatus and one or more storage devices storing instructions that are operable, when executed by the one or more data processing apparatus, to cause the one or more data processing apparatus to perform operations comprising:
receiving, at the wireless audio sink device, user input selecting a user interface control of the plurality of dedicated user interface controls of the wireless audio sink device, wherein each of the plurality of dedicated user interface controls is mapped to a different respective previously paired audio source device of a plurality of previously paired audio source devices, wherein the user interface control is mapped to one of the plurality of previously paired audio source devices, wherein the wireless audio sink device is a slave device of a first master/slave connection with a first paired audio source device of the plurality of paired audio source devices;
initiating, by the wireless audio sink device, a request to become a master device of a second master/slave connection with a second previously paired audio source device corresponding to the selected dedicated user interface control including lookup up previously stored identifying information for the second previously paired audio source device and sending one or more messages to the second previously paired audio source device using the previously stored identifying information for the second previously paired audio source device;
determining, by the wireless audio sink device, that the second master/slave connection has been established with the second previously paired audio source device;
in response to the determining, sending, by the wireless audio sink device to the second previously paired audio source device, a request to become a slave device of the second master/slave connection; and
receiving, by the wireless audio sink device, audio input from the second previously paired audio source device and outputting the received audio input on the one or more audio output devices.

14. The wireless audio sink device of claim 13, wherein the wireless audio sink device is configured to switch to receiving audio input from the second previously paired audio source device without receiving any further user input after receiving the user input selecting the user interface control.

15. The wireless audio sink device of claim 13, wherein the wireless audio sink device is configured to switch to receiving audio input from the second previously paired audio source device without any user input being received by any of the plurality of paired audio source devices.

16. The wireless audio sink device of claim 13, wherein looking up the previously stored identifying information of the second previously paired audio source device corresponding to the selected dedicated user interface control comprises:
identifying a user interface control index corresponding to the selected dedicated user interface control;
identifying a wireless protocol address associated with the user interface control index;
searching a trusted device table for an entry having the wireless protocol address; and
identifying a trusted device index corresponding to the second paired audio source device and
wherein initiating the request comprises using the identified trusted device index to initiate the request to become a master device of a second master/slave connection with the second paired audio source device.

17. The wireless audio sink device of claim 13, wherein the operations further comprise maintaining a separate switching device table that associates user interface control indexes with wireless protocol addresses.

18. The wireless audio sink device of claim 13, wherein the operations further comprise storing, in a persistent data store integrated with the sink device, a switching device table that associates user interface control indexes with wireless protocol addresses.

19. The wireless audio sink device of claim 13, wherein the user interface control is a physical button of a plurality of physical buttons of the sink device.

20. The wireless audio sink device of claim 13, wherein the operations further comprise:
determining, by the wireless audio sink device, that a connection with an audio source device has been lost; and switching, by the wireless audio sink device, to another paired audio source after the connection is lost if and only if further user input selecting a different audio source device is received.

21. The wireless audio sink device of claim 20, wherein the operations further comprise:
   determining, by the wireless audio sink device, that the audio source device is available again; and
   in response, automatically reestablishing a connection with the audio source device.

22. The wireless audio sink device of claim 13, wherein the operations further comprise:
   identifying, by the wireless audio sink device, a particular activity identifier of the second paired audio source device corresponding to the selected user interface control; and
   providing, to the second paired audio source device, the particular activity identifier, and wherein receiving, by the wireless audio sink device, the audio input from the second paired audio source device comprises receiving audio input corresponding to the particular activity identifier.

23. The wireless audio sink device of claim 13, wherein the previously stored identifying information for the second previously paired audio source device comprises a wireless protocol address for the second previously paired audio source device.

24. The wireless audio sink device of claim 13, wherein the previously stored identifying information for the second previously paired audio source device comprises a trusted device index for the second previously paired audio source device.

* * * * *